Figure 1:
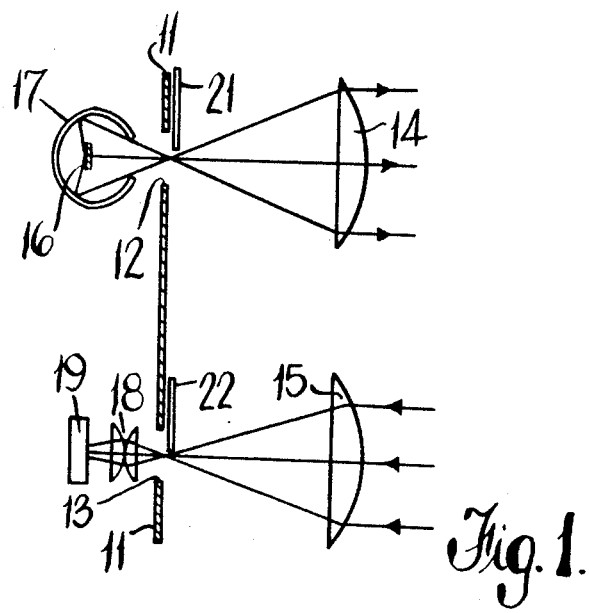

United States Patent

Hicks et al.

[15] 3,663,819
[45] May 16, 1972

[54] ROAD VEHICLE LIGHTING SYSTEM IN WHICH SAME SHUTTER OBSCURES PHOTOCELL WHEN SYSTEM IS OPERATIVE AND WHEN IT IS NOT ENERGIZED

[72] Inventors: Harris Vernon Hicks, Lichfield; Roger William Nolan, Redditch, both of England

[73] Assignee: Joseph Lucas (Industries) Limited, Birmingham, England

[22] Filed: July 15, 1970

[21] Appl. No.: 55,018

[30] Foreign Application Priority Data

July 23, 1969 Great Britain..................36,946/69
Nov. 14, 1969 Great Britain..................50,312/69

[52] U.S. Cl..................250/201, 240/46.05, 250/214 D, 315/82
[51] Int. Cl..................B60q 1/02, F21v 11/18, G01i 1/20
[58] Field of Search..................250/214 D, 201; 315/82; 240/46.05

[56] References Cited

UNITED STATES PATENTS 3,303,346   2/1967   Atkins et al..................250/214 D
2,503,500   4/1950   Lowry..................240/46.05 X Primary Examiner—Archie R. Borchelt
Assistant Examiner—T. N. Grigsby
Attorney—Holman and Stern

[57] ABSTRACT

A lighting system for a road vehicle has the projector for producing a beam of light illuminating the road in front of the vehicle and a receiver with a photocell for receiving light from an oncoming vehicle. There is a first shutter movable to progressively cut off the projected beam, and a second shutter movable to progressively mask the photocell from light from an oncoming vehicle, so that the system achieves a condition wherein sufficient of the projected beam is cut off to avoid dazzling the driver of the oncoming vehicle. The second shutter is returned to a rest position, wherein the photocell is masked, when the projector is not energized, and means is provided for moving the second shutter, when the projector is energized to an inoperative position wherein light can fall on the photocell. This prevents saturation of the photocell during daylight hours.

8 Claims, 4 Drawing Figures

Patented May 16, 1972

3,663,819

2 Sheets-Sheet 1

INVENTOR
Roger William Nolan & Harris Vernon Hicks
Holman & Stern
ATTORNEYS

Patented May 16, 1972

3,663,819

2 Sheets-Sheet 2

INVENTOR
Roger William Nolan & Harris Vernon Hicks
Holman & Stern
ATTORNEYS

ROAD VEHICLE LIGHTING SYSTEM IN WHICH SAME SHUTTER OBSCURES PHOTOCELL WHEN SYSTEM IS OPERATIVE AND WHEN IT IS NOT ENERGIZED

This invention relates to lighting systems, for road vehicles, of the kind including a projector for producing a beam of light illuminating the road in front of the vehicle utilizing the system, a receiver, including a photocell, for receiving light from an oncoming vehicle, a first shutter movable to progressively cut off the projected beam, a second shutter movable to progressively mask the photocell from light from an oncoming vehicle, and means operable in response to stimulation of the photocell by light from an oncoming vehicle for moving the first and second shutters so that the system achieves a condition wherein sufficient of the projected beam is cut off to avoid dazzling the driver of the oncoming vehicle.

In such systems it is usual to arrange that when the system is not in use, the second shutter is moved to an inoperative position wherein light can fall on the photocell so that the system can respond to receive light when the system is next used. However, since light can fall on the photocell, then during daytime the photocell becomes saturated by daylight which temporarily impairs the sensitivity of the photocell, and the present invention seeks to overcome this problem.

According to the invention in a system of the kind specified said second shutter is returned to a rest position, wherein the photocell is masked, when the projector is not energized, and means is provided for moving said second shutter when the projector is energized, to an inoperative position, wherein light can fall on the photocell.

Figure 2:
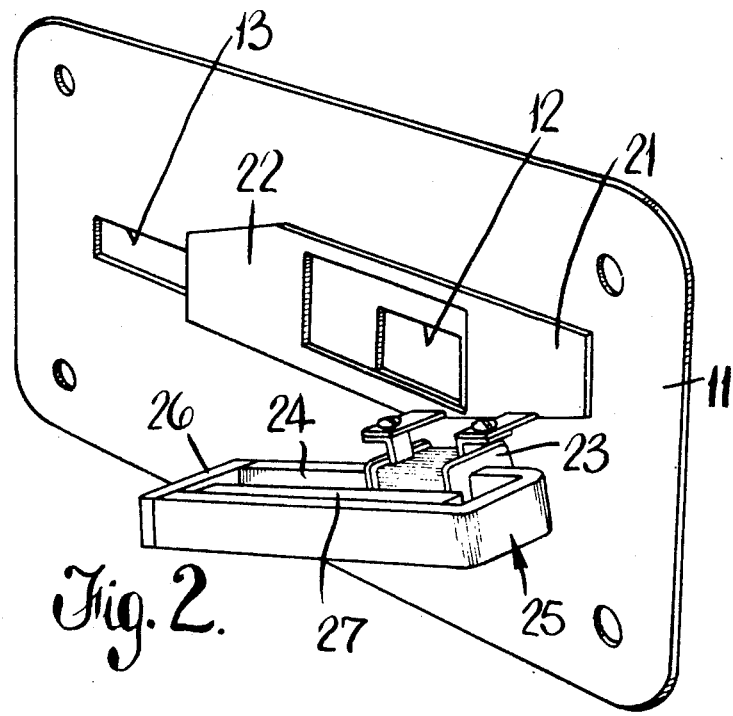
Figure 3:
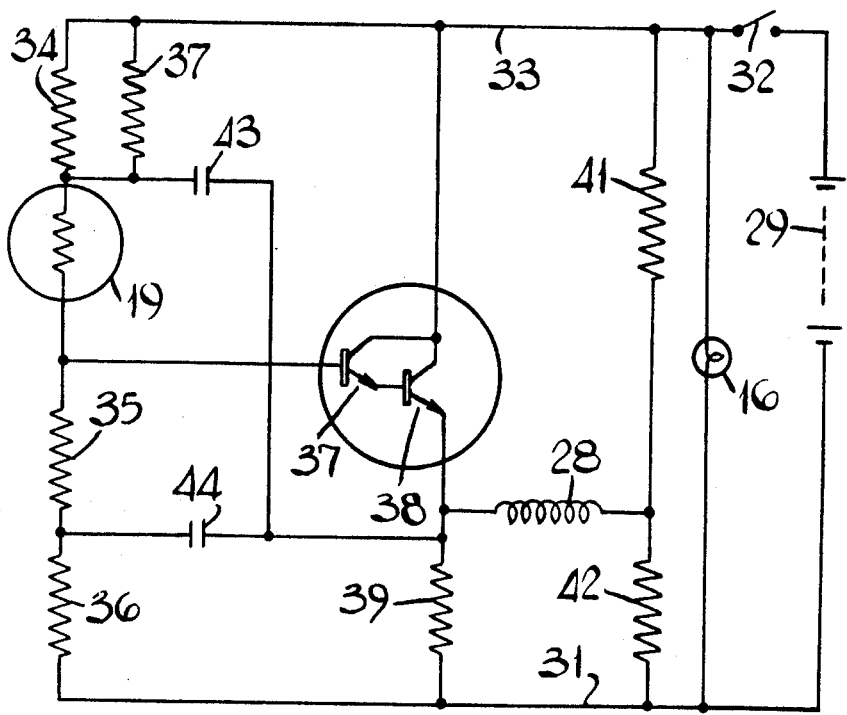
Figure 4:
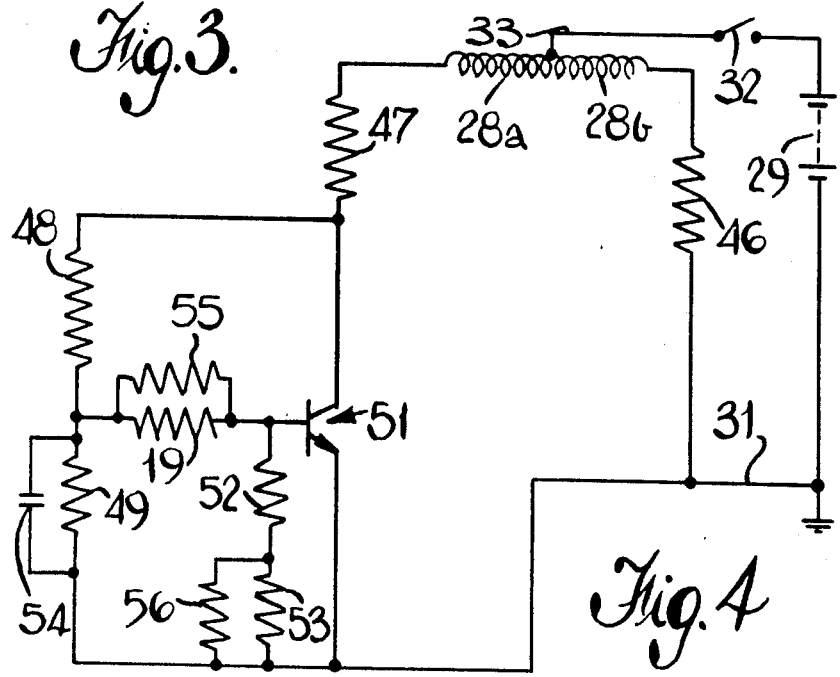

In the accompanying drawings,

FIG. 1 is a diagrammatic representation of part of a lighting system according to one example of the invention, FIG. 2 is a perspective view of part of the system, and FIGS. 3 and 4 are circuit diagrams showing two alternative control circuits for use in the system.

Referring to FIGS. 1 and 2 of the drawings, the lighting system includes a casing having a forwardly presented, sheet metal bulkhead 11. The bulkhead 11 is formed with a pair of spaced, rectangular apertures 12, 13 and secured to the front wall of the casing, and aligned with the apertures 12, 13 respectively are a pair of lenses 14, 15, the focal points of the lenses 14, 15 being in the apertures 12, 13 respectively. The lens 14 and the aperture 12 define part of a projector including a high intensity bulb having its filament 16 at one focus of a part elipsoidal mirror 17, the other focus of the mirror 17 being coincident with the focal point of the lens 14, in the aperture 12. Thus, light from the filament 16 is reflected forwardly by the mirror 17 through the aperture 12 and thence through the lens 14 to produce a beam of light illuminating the road in front of the vehicle equipped with the lighting system. The optical arrangement is such that a well defined image of the aperture 12 is projected forwardly, so that the beam of light is of rectangular section.

The lens 15 and the aperture 13 define part of a receiver of the lighting system, the receiver further including a condenser lens system 18, and a photocell 19. Light from an oncoming vehicle is directed by the lens 15 through the aperture 13, and is focused by the condenser lens system 18 onto the photocell 19. The optical arrangement of the receiver is such that an image of the lens 15 fall on, and almost fully covers the sensitized surface of the cell 19, and is this way the image of the lens 15 falls centrally on the photocell 19 irrespective of the position of the image in the aperture 13. If the image falls outside the aperture 13 then no light falls on the cell 19, and so the receiver is to this extent sensitive to the direction of incoming light.

Movable across the apertures 12, 13 respectively are a pair of physically interconnected shutters 21, 22. The interconnected shutters 21, 22 are carried by a spool 23 which is slidably mounted on an inclined bar 24 forming one limb of a U-shaped magnetic frame 25, the open end of which is closed by a keeper 26. Secured to the limb opposite the bar 25 is a permanent magnet 27, and on the spool 23 is a winding 28, energization of which causes movement of the spool along the bar 24. The frame 25 is inclined to the horizontal, so that gravity urges the spool and shutter assembly to a position wherein the shutters 21, 22 completely cover their respective apertures 12, 13. It will be noted that as the spool moves along the bar 24, the shutters will have a vertical component of movement, so that the depth of the shutters must be sufficient to ensure that the shutters cover their respective apertures in the required manner.

Referring now to FIG. 3, the winding 28 forms part of a control circuit which is energized by the battery 29 of a road vehicle, the battery 29 having its negative terminal connected to a supply line 31, which conveniently is earthed, and its positive terminal connected through a control switch 32 to a supply line 33. Connected in series between the lines 33, 31 are a thermistor 34, the photocell 19, and resistors 35, 36. The thermistor is bridged by a resistor 37, the purpose of which is to modify the thermistor characteristics so that they match the characteristics of the photocell. The junction of the photocell 19 and resistor 35 is connected to the base of an n-p-n transistor 37, the emitter of which is connected to the base of a second n-p-n transistor 38 having its emitter connected to the line 31 through a resistor 39. The collectors of the transistors 37 and 38 are connected to the line 33, and a further pair of resistors 41 and 42 are connected in series between the lines 33 and 31, the winding 28 having one end connected to the junction of the resistors 41 and 42, and its other end connected to the junction of the resistor 39 and the emitter of the transistor 38. The emitter of the transistor 38 is further connected through capacitors 43 and 44 respectively to the junction of the resistor 34 and photocell 19, and to the junction of the resistors 35 and 36.

During daylight hours, the switch 32 will be open and so no current will flow in the winding 28. The spool will be urged by gravity to a position in which the shutters 22 and 21 cover the apertures 13 and 12 respectively, and this position can be termed the rest position. Because the aperture 13 is closed, no light fall on the photocell 19 during daylight hours. By virtue of this feature, the arrangement overcomes the difficulty that if the photocell is exposed to daylight, then when the system is first used at night, the photocell does not function satisfactorily for a short period of time.

When it is desired to use the system, the switch 32 is closed, and energizes the filament 16 of the projector. At this stage the photocell 19 is covered, and so no light can fall upon it. The transistor pair 37 and 38 will have a high resistance, and the resistances of the resistors 41, 42 and 39 are equal, so that these three resistors together with the transistor pair 37 and 38 form a simple bridge network the output of which is applied to the winding 28. Thus, at this stage current will flow through the winding 28 by way of the resistor 41 and the resistor 39, and this current flow will cause the spool 24 to move against the action of gravity to the position shown in FIG. 2, in which the apertures 13 and 12 are uncovered. A beam of light is now projected forwardly as previously described, but if light from an oncoming vehicle entering the aperture 13 falls on the photocell 19, the resistance of the transistor pair 37, 38 will fall to a value below the resistances of the resistors 39, 41 and 42, so that current flows through the winding 28 in the opposite direction, causing positive movement of the spool down the bar 24. This movement continues until the shutter 22 prevents the oncoming light from reaching the photocell at which point the transistor pair 37, 38 will again assume a very high resistance, and the current flow through the winding 28 will again be reversed, tending to move the spool up the bar 24. This oscillatory movement would not of course be satisfactory, but the capacitors 43 and 44 damp the system so that the shutter 22 assumes an equilibrium position with the leading edge of the shutter 22 at a position corresponding to the position of the image in the aperture 13. The shutters 21, 22 are so positioned with respect to one another that in the equilibrium position the shutter 21 cuts off sufficient of the projected beam, starting from the side of the beam nearest the center of the road, to ensure that the driver of the oncoming vehicle is not dazzled by the projected beam. As the relative positions of the vehicle equipped with the system, and the oncoming vehicle change, the position of the image of the oncoming lights changes in the aperture 13, and the shutters 21, 22 are moved to follow the change in position of the image, and so the projected beam is always controlled in such a manner that the driver of the oncoming vehicle is not dazzled by the projected beam. The dimensions of the shutters 21, 22 and the apertures 12, 13 are such that in the specific case when the image of the lights of the oncoming vehicle is at the extreme end of the aperture 13 the shutter 21 will be in a position completely closing the aperture 12, while the aperture 13 is still partially open, so that light still falls on the photocell 19 to maintain the aperture 12 closed.

The mirror 17 is capable of transmitting the red and infra red wavelengths which eminate from the filament 16, while reflecting the remaining wavelengths to produce the image of the filament 16 in the aperture 12. Thus the projected beam contains no red or infra-red wavelengths. The photocell 19 is primarily sensitive to the red and infra-red wavelengths, and so the risk of unwanted operation of the system by reflection of the projected beam back into the receiver, from, for example, a wall is reduced. However, the system will still be operated by the headlamps of an oncoming vehicle since they will contain red and infra-red wavelengths. It will be appreciated that the lighting system of the invention is not intended to replace the normal vehicle headlamps, but to be used in conjunction therewith.

It will be appreciated that since the spool is urged by gravity from its inoperative position shown in FIG. 2, that its to say the position to which it is moved by the winding 28 when the switch 32 is closed, towards its rest position, which is the position it assumes when the switch 32 is open, it is possible to arrange that the spool 24 is urged downwardly only by gravity, and moved against the action of gravity by the winding 28. However, the arrangement disclosed, in which the winding 28 effects positive movement of the spool in both directions, is preferred because it is more accurate.

If desired, a spring can be utilized to assist the action of gravity in returning the spool 24 from the inoperative position to the rest position when the switch 32 is opened. Alternatively, a spring can be used with the bar 24 horizontal, in which case the operation is precisely as described, except that the return action is under the control of the spring alone. Using such an arrangement, the spring will move the spool more consistently than gravity, and so the simpler form of amplifier mentioned above can be employed if desired.

FIG. 4 shows an alternative form of control circuit in which the winding 28 is center tapped to form two windings 28a, 28b with the center tapping connected to the supply line 33. The other end of the winding 28b is connected through a resistor 46 to the line 31, whilst the other end of the winding 28a is connected to one end of a resistor 47. The other end of the resistor 47 is connected to earth through parallel paths one of which contains resistors 48 and 49 in series, and the other of which contains the collector-emitter path of a transistor 51. The junction of the resistors 48 and 49 is connected through the photocell 19 to the base of the transistor 51, which is further connected to earth through a pair of resistors 52 and 53 in series. The resistor 49 is bridged by a capacitor 54, the photocell 19 is bridged by resistor 55 and the resistor 53 is bridged by resistor 56.

When the switch 32 is open so that the projector is switched off, the winding 28 is de-energized and the spool 23 together with the shutters 21, 22 move under gravity (or spring action) to a rest position wherein the shutters 21, 22 completely close their respective apertures 12, 13. When the switch 44 is closed, current flows through the winding 28b and the resistor 46 in series to move the spool 23 and the shutters 21, 22 to an inoperative position wherein the apertures 12, 13 are at least partially open. At this stage the resistance of the photocell 19 is very high so the transistor 51 receives no base current, with the result that the winding 28a is not energized. The system is now in an operative condition wherein it can respond to light from an oncoming vehicle. When light is received from an oncoming vehicle, the light falls on the photocell 19, the resistance of which is substantially lower so that the transistor 51 can conduct, energizing the winding 28a, which moves the spool against the action of the winding 28b until the shutters 21, 22 reach a position wherein the shutter 22 just then prevents the image of the oncoming light falling on the photocell 19, whereupon the resistance of the photocell 19 increases substantially and the transistor 51 ceases to conduct. In the absence of any damping the shutters 21, 22 will oscillate about the point at which the shutter 22 blocks the image of the oncoming lights in the aperture 13, and the capacitor 54 is provided to damp the action of the amplifier. The stability of the system is further improved by the degenerative feedback through the resistor 48, this feedback being amplified by the resistor 47. The resistor 55 also improves the stability of the system, and the resistors 52, 53 together with resistor 56, which preferably is a thermistor, provides temperature compensation. It will of course be appreciated that although a simple transistor 51 is shown in the drawing, it could be replaced by any semiconductor amplifying arrangement using one or more transistors.

In many cases the sensitivity of the photocell 19 will vary with ambient temperature, and if this factor is of importance the resistor 55 can be replaced by a combination of resistors and thermistors to compensate for variations in photocell sensitivity.

Having thus described our invention what we claim as new and desire to secure by Letters Patent is:

1. A lighting system for a road vehicle including a projector for producing a beam of light illuminating the road in front of the vehicle utilizing the system, a receiver, including a photo cell, for receiving light from an oncoming vehicle, a first shutter movable to progressively cut off the projected beam, a second shutter movable, from a datum position in which light from an oncoming vehicle can fall on said photo cell, to progressively mask the photo cell from light from an oncoming vehicle, means operable in response to stimulation of the photo cell by light from an oncoming vehicle for moving the first and second shutters so that the system achieves a condition wherein sufficient of the projected beam is cut off to avoid dazzling the driver of the oncoming vehicle, and in which said second shutter is returned to a rest position, wherein the photo cell is masked, when the projector is not energized, and means is provided for moving said second shutter when the projector is energized, to said datum position.

2. A system as claimed in claim 1 in which the second shutter is moved to said rest position by gravity.

3. A system as claimed in claim 1 in which the second shutter is moved to said rest position by a spring.

4. A system as claimed in claim 2 in which the second shutter is moved from its rest position to its datum position by a control circuit which is energized when the projector is energized, the photocell acting in response to light from an oncoming vehicle to cause the control circuit to effect positive movement of the first shutter to a position in which sufficient of the projected beam is cut off.

5. A system as claimed in claim 4 in which the shutters are carried by a spool mounted for sliding movement in the magnetic field of a permanent magnet and carrying a winding, the current flow through which is controlled by the control circuit.

6. A system as claimed in claim 5 in which the winding is tapped along its length, one part of the winding being permanently energized in use to move the spool to a position corresponding to the inoperative position of the second shutter, and the other part of the winding acting to move the spool in the opposite direction, current flow in said other part of the winding being controlled by the photocell.

7. A system as claimed in claim 5 in which the control circuit includes a bridge network the output from which is applied to said winding, the bridge network passing current through the winding in one direction when the photocell is not illuminated to move the spool to a position corresponding to the inoperative position of the second shutter, and passing current through the winding in the opposite direction when the photocell is illuminated.

8. A lighting system for a road vehicle, comprising a projector for producing a beam of light illuminating the road in front of the vehicle utilizing the system, a receiver including a photo cell for receiving light from an oncoming vehicle, first and second interconnected shutters, a spring urging said first and second shutters to a rest position in which said first shutter cuts off the projected beam, and said second shutter masks the photo cell, a control circuit which is energized when said projector is energized, said control circuit when energized moving said shutters to a datum position in which said first shutter no longer cuts off the projected beam, and the second shutter allows light from an oncoming vehicle to fall on the photo cell, and means coupling the control circuit with said photo cell whereby said photo cell acts in response to light from an oncoming vehicle to decrease the output of the control circuit so that the shutters are moved by said spring to a position wherein sufficient of the projected beam is cut off by said first shutter to avoid dazzling the driver of an oncoming vehicle.

* * * * *